3,161,539
COMPOSITION OF MATTER HAVING HIGH DIELECTRIC CONSTANT
George P. Touey and Richard G. Devaney, Kingsport, Tenn., assignors to Eastman Kodak Company, Rochester, N.Y., a corporation of New Jersey
No Drawing. Filed May 11, 1961, Ser. No. 109,263
5 Claims. (Cl. 117—143)

This invention relates to composition of matter which comprises a mixture of a polymeric material of high molecular weight and cyanoethylated sucrose adapted to the manufacture of capacitors and electroluminescent cells.

It is well known in the art that there are certain organic compounds having high dielectric constants of value in the manufacture of certain electrical equipment. Their mode of operation generally is believed to be due to the tendency of the polar part of the molecular arrangement thereof to follow the electrical field as it alternates. The array of orientated polar molecules may give an electric moment to the material which results in a high dielectric constant.

One approach which has been used to obtain products of a plastic film or wrapping of good dielectric constant value is to impregnate the film or wrapping material with liquids having good dielectric properties. In many cases not only does such addition increase the dielectric constant but also serves to plasticize the plastic material. Conventional plasticizers, on the other hand, do little or nothing for the dielectric properties of products of this kind.

One group of organic plasticizers which has been reported as being suitable for producing satisfactory dielectric properties in films or plastics consists of the cyanoethyl phthalates. Although these compounds are useful plasticizers, their dielectric constants have been only moderate and therefore contribute to no more than a moderate extent to the dielectric constant of the material in which they are incorporated.

One object of our invention is to provide a composition of matter composed of polymers of high molecular weight which is suitable for use in cases where high dielectric constant is required. Another object of our invention is to provide a composition which is useful for use in the manufacture of capacitors, electroluminescent cells or like electrical equipment. A further object of our invention is to prepare compositions of matter which have, in addition to a high dielectric constant, a low power-loss factor. Other objects of our invention will appear herein.

We have found that by incorporating cyanoethylated sucrose, as described and claimed in U.S. application Serial No. 805,730, in a plastic composition in an amount at least 5–50% of the high-polymer plastic material that a product is obtained having good dielectric properties. It is desirable that the cyanoethylated sucrose used is one that has at least 5 and preferably 7 or more of its hydroxyl groups cyanoethylated.

A satisfactory method for making cyanoethyl sucrose to be used in compositions in accordance with our invention comprises the following: A mixture of 342 g. (1 mol) of sucrose and 350 g. of aqueous 10% potassium hydroxide was warmed to 40° C., following which 446 g. (8.4 mols) of acrylonitrile were slowly added to the stirred mass over a one hour period, which was kept at a temperature of 40±3° C., in a jacketed container cooled by water. The 40±3° C. temperature was maintained for 20 minutes after the addition of the acrylonitrile. The mass was then cooled to 20° C. and 1000 ml. of 1,2-dichloroethane was added. A water layer which formed was withdrawn and the organic layer obtained was washed with 500 cc. of aqueous acetic acid, followed by washing with 500 cc. of distilled water. The organic layer was filtered and the dichloroethane was distilled therefrom under reduced pressure. The syrupy product obtained was heated at 90° C. at 1 mm. pressure for 2 hours which removed residual solvent from the product. The final product was a viscous, pale yellow liquid having 14% nitrogen content and 2.2% hydroxyl. The sucrose cyanoethyl ether obtained was insoluble in water, but was soluble in several common organic solvents.

The composition in accordance with our invention may be composed of any polymeric material of high molecular weight with which the sucrose cyanoethyl ether may be mixed. For instance, some of the high polymeric materials may be wood pulp, partially cyanoethylated wood pulp, cyanoethylated cellulose, cellulose acetate, polyacrylates, polymethacrylates, polyvinyl compounds and polyester compounds. The amount of improvement imparted to a sheeting material of a composition as described herein will depend on the amount of cyanoethyl sucrose added thereto. Ordinarily this amounts to 5 to 50% of the film forming material and adds to the dielectric qualities of the base polymer.

The electrical properties of compositions in accordance with the invention were determined, the composition having been formed into a sheet such as paper, film, or the like: The dielectric constant and dissipation factor were determined in accordance with the standard method outlined in ASTM D150–54T, "Micrometer Electrode System." The following apparatus was employed in running these tests: A Hewlett-Packard, Model 200 CR oscillator, a General Radio Type 1690 film sample holder, a General Radio Type 716–BS2 Schering bridge, and a General Radio Type 1231–B null detector. Measurements on the plasticizer itself also utilized a Leeds and Northrup liquid cell Type 1151 and a General Radio guard circuit Type 716–P4. Measurements were made at 0.1 kc., 1.0 kc., 10 kc., and 100 kc. at temperatures between 25 and 100° C. Film samples were prepared for measurements by evaporating gold onto the surface to form intimately contacting, 2-inch diameter, electrodes several hundred angstroms thick. Following metallization, the sample was placed in the sample holder using great care to be certain the gold electrodes coincided with the electrodes of the sample holder. As the temperature and frequency applied to the sample varied, the change in capacitance and dissipation factors was noted directly by balancing the bridge. From this difference the real dielectric constant was calculated. Also calculated were the loss factor and the product of the dielectric constant and dissipation factor, which is proportionate to the energy lost per cycle. The vector sum of the real dielectric constant and the loss factor yielded the complex dielectric constant.

In the case of measurements of impregnated papers, capacitors were first made by helically winding alternate layers of paper and aluminum foil to form a tight cylindrical configuration. Wire leads were inserted at the electrical mid-point. Following winding, the capacitors and a container of the impregnant, cyanoethyl sucrose, were separately placed in a vacuum chamber and the air exhausted to a pressure of 0.10 micron. This pressure was maintained for about an hour as the impregnant was heated to about 100° C. to lower its viscosity and to remove dissolved air and water. When the impregnant was at 100° C. the capacitors were caused to fall into the fluid whereupon atmospheric pressure was restored to the chamber to force the impregnant into the dielectric paper between the aluminum foils. Capacitors thus made must be kept immersed in the fluid impregnant in a suitable case. Measurements were made on these cased capacitors using the previously described equipment except that neither sample holder was required.

The following examples illustrate the preparation of compositions in accordance with our invention:

EXAMPLE 1

A paper capacitor was impregnated with cyanoethyl sucrose having a nitrogen content of 13.6% by the method described above. The paper was a purified grade of kraft liner of about 0.3 mil thickness. The following table shows the large capacitance increase obtained in the case of the paper impregnated with cyanoethyl sucrose:

|  | Size $\mu f.$ | Dissipation Factor | Dielectric Strength at 500 v./sec., volts |
|---|---|---|---|
| Before Impregnating | 0.01 | 0.002 | 400 |
| After Impregnating | 0.20 | 0.010 | 3,000 |

EXAMPLE 2

Cyanoethyl sucrose was incorporated in cellulose acetate and also in cyanoethyl cellulose and in addition to increasing the dielectric constant of these materials, the cyanoethyl sucrose also served as a plasticizer therefor.

Viscous solutions of cellulose acetate (40% acetyl) and cyanoethyl cellulose (30% nitrogen) were prepared by dissolving in each case 20 g. of polymer in 120 ml. of acetone. These solutions were then divided into equal portions. To one of the portions in each case no material was added and to the other portions 10 g. of cyanoethyl sucrose (14.1% nitrogen) was added. Each of the four solutions were cast onto a glass plate and the solvent was allowed to evaporate therefrom at room temperature. The films of 2 mils thickness were stripped from the plate and heated for 24 hours at 80° C. and 10 mm. pressure to remove residual acetone. They were then stored at 75° C. and 45% relative humidity for 24 hours, whereupon their electrical properties and flexibility were determined. The following results were obtained:

*Properties of Films With and Without Cyanoethyl Sucrose*

| Film | Percent Cyanoethyl Sucrose in Film | Flexibility | Dielectric Constant at 1.0 kc. and 25° C. | Dissipation Factor at 1.0 kc. and 25° C. |
|---|---|---|---|---|
| Cellulose acetate | 0 | Brittle | 4.0 | 0.015 |
| Do | 50 | Very flexible | 15.0 | 0.020 |
| Cyanoethyl cellulose | 0 | Brittle | 12.0 | 0.020 |
| Do | 50 | Very flexible | 22.0 | 0.030 |

As can be seen, the addition of cyanoethyl sucrose to the film in each case caused a large increase in dielectric constant without adversely effecting the dissipation factor (power loss).

We claim:
1. A composition of matter having high dielectric constant comprising an organic polymeric sheet forming material having dielectric qualities and 5–50%, based on the weight of the polymeric material of cyanoethylsucrose in which greater than 5 hydroxyl groups of the sucrose have been cyanoethylated.
2. A composition of matter having a high dielectric constant comprising a cellulosic material having dispersed therein 5–50%, based on the weight of the cellulose, of cyanoethyl sucrose in which greater than 5 hydroxyl groups of the sucrose have been cyanoethylated.
3. Paper containing therein 5–50% of cyanoethyl sucrose in which greater than 5 hydroxyl groups of the sucrose have been cyanoethylated based on the weight of the cellulose in the paper.
4. A composition of matter comprising cellulose acetate and cyanoethyl sucrose in which greater than 5 hydroxyl groups of the sucrose have been cyanoethylated, the latter constituting 5–50% of the weight of the cellulose acetate.
5. A composition of matter comprising cyanoethyl cellulose and cyanoethyl sucrose in which greater than 5 hydroxyl groups of the sucrose have been cyanoethylated, the latter comprising 5–50%, based on the weight of the cyanoethyl cellulose.

References Cited by the Examiner
UNITED STATES PATENTS

| 1,996,858 | 4/35 | Davidson | 117—156 |
| 2,259,978 | 10/41 | McLean | 117—156 X |
| 2,461,502 | 2/49 | Moe | 260—209 |
| 2,563,526 | 8/51 | Gaver | 260—209 X |
| 2,836,512 | 5/58 | Sample | 117—156 X |
| 3,068,220 | 12/62 | Touey et al. | 260—209 |

RICHARD D. NEVIUS, *Primary Examiner.*